UNITED STATES PATENT OFFICE.

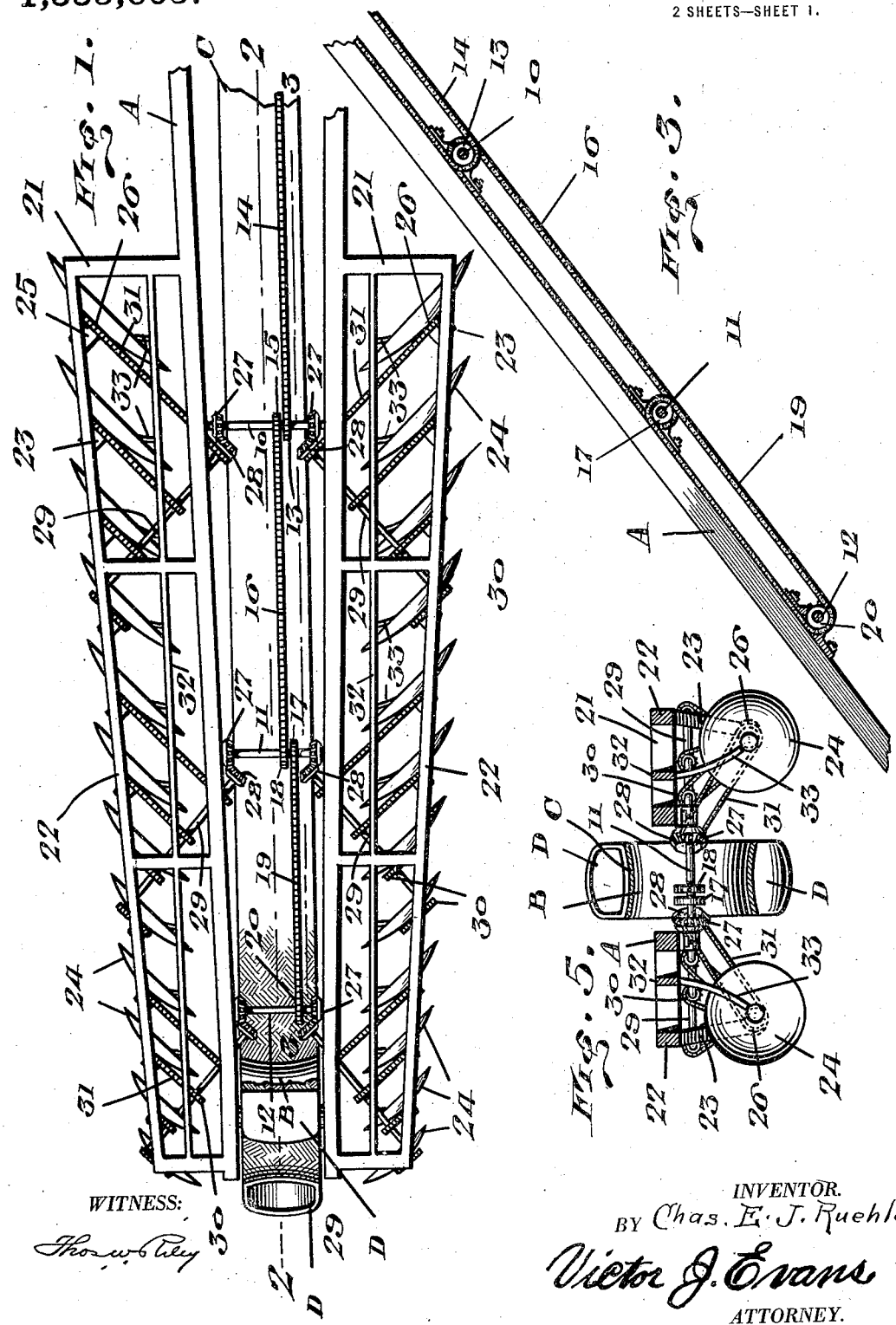

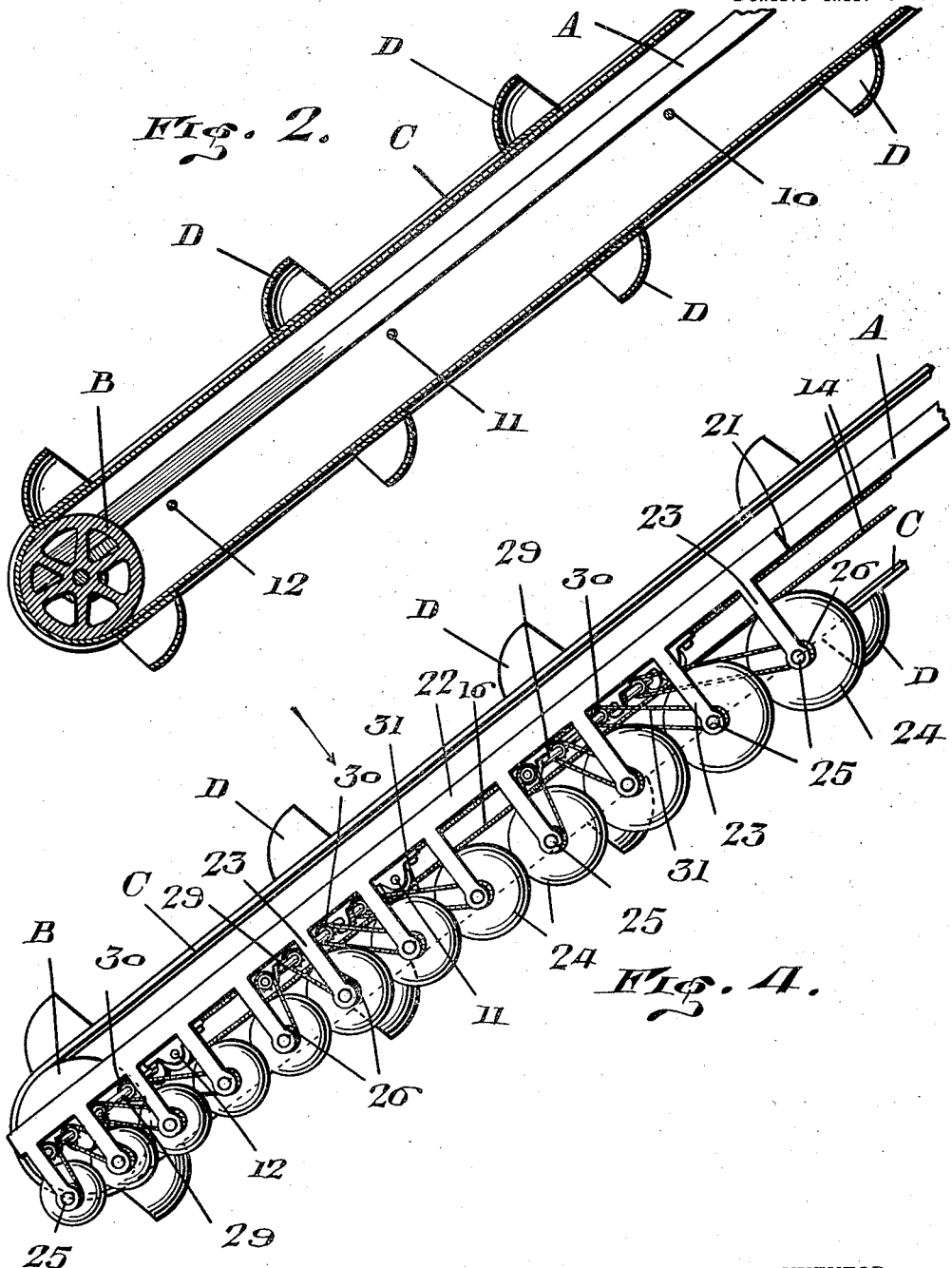

CHARLES E. J. RUEHLE, OF RUTHVEN, IOWA.

ATTACHMENT FOR DITCHING-MACHINES.

1,335,605.  Specification of Letters Patent.  Patented Mar. 30, 1920.

Application filed August 1, 1919. Serial No. 314,676.

*To all whom it may concern:*

Be it known that I, CHARLES E. J. RUEHLE, residing at Ruthven, in the county of Palo Alto and State of Iowa, have invented new and useful Improvements in Attachments for Ditching-Machines, of which the following is a specification.

The invention relates to ditching machines, particularly to attachments therefor, and has for its object the provision of a device which may be attached to the boom of an ordinary ditching machine of standard make provided with a boom, whereby a ditch may be cut with sloping sides and also of greater width than is cut by the ordinary machine, it being well known that the ordinary ditching machine makes a cut having vertical sides.

An important object is the provision of a device of this character which will be a great labor saver by avoiding the necessity for the manual digging away of the sides of a ditch, as is necessary when an ordinary ditching machine is used and a sloping walled ditch is desired.

An additional object is the provision of a device of this character which will be comparatively simple and inexpensive in manufacture, highly efficient in use, durable in service, and a general improvement in the art.

With the above and other objects and advantages in view, the invention consists in the details of construction to be hereinafter more fully described and claimed, and illustrated in the accompanying drawings, in which Figure 1 is a view of the boom of a ditching machine showing my attachment applied thereto, Fig. 2 is a central longitudinal sectional view on the line 2—2 of Fig. 1, Fig. 3 is a longitudinal sectional view on the line 3—3 of Fig. 1, Fig. 4 is a side elevation, and Fig. 5 is a cross sectional view.

Referring more particularly to the drawings, the letter A designates the boom of a ditching machine and B designates the roller at the smaller end of the boom about which is trained the digging chain C having the usual shovels D.

In carrying out my invention I provide transverse shafts 10, 11 and 12 which extend across the sides of the boom. Mounted upon the shaft 10 is a sprocket 13 about which is trained a chain 14 driven by any suitable means from the drive mechanism of the ditching machine, not shown. Secured upon the shaft 10 is a sprocket 15 about which is trained a chain 16 which is in turn trained about a sprocket 17 mounted upon the shaft 11, which is also provided with a sprocket 18 having trained thereabout a chain 19 trained about a sprocket 20 on the shaft 12. From this it will be seen that the shafts 10, 11 and 12 will be simultaneously rotated. Secured to the boom at each side thereof, is a frame-work 21 including end bars, outer longitudinally extending bars 22 which converge toward the smaller end of the boom. Secured upon each of the bars 22 and extending downwardly and inwardly therefrom is a plurality of arms 23 upon the inner end of each of which is journaled a disk 24 having its spindle 25 carrying a sprocket 26. The disks are so arranged that lines drawn through the axes of the successive disks in the frames 21 will converge downwardly.

At each end of each of the shafts 10, 11 and 12 is a bevel gear 27 which meshes with a bevel gear 28 carried upon the adjacent end of a downwardly and outwardly inclined shaft 29. The shafts 29 are provided at each end of the shafts 10, 11 and 12 and each has its other end suitably journaled in the associated frame bar 22. Secured upon each of the shafts 29 is a plurality of sprockets 30 and trained about the sprockets 30 are chains 31 which extend to and are trained about the sprockets 26. It will be seen that when the shafts 10, 11 and 12 are rotated all the shafts 29 will be rotated which will result in rotation of all of the disks 24. It will be observed that the peripheries of the disks extend outwardly beyond the outermost frame bars 22 whereby to effect cutting action.

In order that dirt adhering to the disks may be effectually removed therefrom, I provide in each of the frames 21 a longitudinally extending bar 32 which carries at each disk a scraper blade 33 engaging against the upper surface of the disk so that as the disks rotate they will be automatically scraped clean by the scrapers 33.

It will be obvious in the use of the device that the cross sectional configuration of a ditch cut by my attachment will be the same as the contour of my device, that is to say, the top of the ditch will be appreciably wider than the bottom thereof so that the sides will have the desired slope so advantageous in preventing sliding or caving in of the ditch walls. It is also apparent that the ditch will be wider at the bottom than a ditch cut by the ordinary ditching machine.

While I have shown and described the preferred embodiment of my invention, it is of course to be understood that I reserve the right to make such changes in the form, construction, and arrangement of parts as will not depart from the spirit of the invention or the scope of the subjoined claims.

Having thus described my invention, I claim:

1. An attachment for the boom of a ditching machine comprising a frame disposed upon each side of the boom and extending laterally therebeyond, a plurality of downwardly and inwardly inclined arms extending from each frame, downwardly and outwardly inclined shafts journaled within said frames, disks journaled upon said arms and having their peripheries projecting beyond said frames, means operatively connecting said shafts and said disks and means driven by the digging chain of the ditching machine for driving said shafts and consequently said disks.

2. In combination with the boom and digging chain of a ditching machine, frames arranged upon opposite sides of the boom and extending laterally therebeyond in opposite directions, arms carried by each frame, a disk journaled upon each arm, the disks in each frame being arranged one above another in parallel relation and disks in one frame lying in planes converging with respect to the planes in which lie the disks in the other frame, and means driven by the digger chain operated mechanism for rotating all of said disks simultaneously.

3. In combination with the boom and digging chain of a ditching machine, frames arranged upon opposite sides of the boom and extending laterally therebeyond in opposite directions, arms carried by each frame, a disk journaled upon each arm, the disks in each frame being arranged one above another in parallel relation and the disks in one frame lying in planes converging with respect to the planes in which lie the disks in the other frame, and means driven by the digger chain operated mechanism for rotating all of said disks simultaneously, said means comprising a plurality of shafts journaled in each frame in parallel relation to the axes of the disks therein, sprockets mounted on said shafts, other sprockets connected with the disks, chains trained about the associated sprockets and means for simultaneously rotating said shafts.

4. In combination with the boom and digging chain driving mechanism of a ditching machine, frames carried by the boom and extending from opposite sides thereof, said frames being wider at their upper than at their lower ends, a plurality of disks arranged within each frame and projecting beyond the sides thereof, the arrangement of said disks being that lines drawn through the axes thereof will converge toward the bottom of the boom, and means operatively connected with the digger chain operating mechanism whereby to rotate all of said disks simultaneously.

In testimony whereof I affix my signature.

CHARLES E. J. RUEHLE.